United States Patent [19]

Carnegie, Jr.

[11] 4,055,456
[45] Oct. 25, 1977

[54] IMPULSE HEAT-SEALING MACHINE
[75] Inventor: Frank Carnegie, Jr., Montville, N.J.
[73] Assignee: Camid Intermatic, New York, N.Y.
[21] Appl. No.: 711,597
[22] Filed: Aug. 4, 1976
[51] Int. Cl.² .............................................. B32B 31/00
[52] U.S. Cl. ................................... 156/366; 156/515; 156/583
[58] Field of Search ................ 156/515, 510, 583, 366
[56] References Cited
U.S. PATENT DOCUMENTS

| 3,522,133 | 7/1970 | Gross | 156/583 |
| 3,540,972 | 11/1970 | Irwin et al. | 156/583 |
| 3,703,427 | 11/1972 | Sellers et al. | 156/583 |

Primary Examiner—Douglas J. Drummond
Attorney, Agent, or Firm—Eliot S. Gerber

[57] ABSTRACT

An impulse heat sealing machine for forming a liquid leakproof seal joining flexible thermoplastic resin films includes a platen which compresses the films under pressure, an etched foil heater carried by the platen and protected by a non-sticking sheet, and timers which determine the timing for the platen to compress the films, impulse heat seal the films, cool the joined films under pressure, and release the platen pressure.

8 Claims, 3 Drawing Figures

IMPULSE HEAT-SEALING MACHINE

BACKGROUND OF THE INVENTION

In one type of sealing and cutting device an electrically heated resistance wire is passed through two plastic resin film sheets. The heat melts the sheets so that they simultaneously adhere together along a line and are severed along the same line. The wire may be heated either intermittently or constantly and may be temperature controlled. One type of wire sealer is described in U.S. Pat. No. 3,792,770 to Freeman.

Although some types of heated wire sealers may be relatively inexpensive and relatively rapid in operation, they are not able to consistently produce strong liquid-tight leakproof seals. For example, there are likely to be at least a few leaking bags in a group of liquid containing bags sealed by heated wire sealers. In some products the presence of an imperfect or less than consistently perfect seal may be acceptable, for example, in frozen foods packaged in plastic resin film pouches. However, such inferior sealing is not acceptable in other situations. In addition, the seal made by a heated wire has relatively little strength and may easily burst from internal pressure.

At the present time it is possible to seal a few types of plastic film, such as polyvinylchloride (PVC), by means of high-frequency electromagnetic field (radio frequency) sealing devices. However, such high-frequency sealers are not applicable to other types of plastics and specifically they will not seal certain types of polyethylene and polyester films in a liquid-tight seal. There are various applications in which polyvinylchloride film is utilized because a liquid-type seal can be formed using that material; but for other reasons it would be preferable to use other types of plastic resin films. For example, in the use of colostomy bags it is vital that the bag be leakproof. Those colostomy bags which are presently made of polyvinylchloride PVC film present certain disadvantages; for example, the film is not impervious to vapor, which may cause an odor problem. In addition, the PVC film of the bags, in order to be pin-free, that is, free of small pin-size holes, must be relatively thick, in the order of 10 mils. Such PVC film, which is usually made by a casting process, is expensive and conceivably may involve a long-range contamination problem.

It would obviously be preferable to have a disposable colostomy bag made of thinner plastic resin film which is chemically inert, such as polyethylene. However, as explained previously, a seal made by a hot wire, which is a "tear seal," does not provide sufficient strength against bursting from internal pressure. The use of an additional hot wire knife would also not be satisfactory since it would produce only a thin sealing bead not having sufficient strength to prevent bursting from internal pressure. Other examples of products which are presently made of relatively thick polyvinylchloride and which could utilize thinner film of other less expensive or less chemically active materials include other medical products such as blood containers, gloves, disposable foot coverings, laboratory disposable clothing, and other items.

SUMMARY OF THE INVENTION

The present invention simultaneously seals and severs a plurality of plastic resin films to form a pouch or container of some desired shape which has a liquid-tight seal. The films are moved into position, for example, by a rotary index table, or unrolled from rolls.

The films, one on top of the other, are positioned between a platen and a base. Preferably the platen will move and compress the films in a timed relationship and then the platen will be opened. The platen carries an etched metal foil resistance heater element covered by a non-stick layer. The heat element, of at least one sixteenth inch in width, forms a seal when it is impulse heated. A separate heated knife, also carried by the platen, melts and severs the film. The knife is close to the heater element and has a separate timer and a separate movement control.

FEATURES AND OBJECTIVES OF THE INVENTION

It is an objective of the present invention to provide a heat sealing apparatus and method to seal together sheets of thermoplastic resin film which apparatus and method:

a. will provide a liquid leakproof seal;

b. will provide a pouch or container which has strength to resist internal pressure and, for example, when filled with liquid, will resist bursting on being dropped or otherwise mishandled;

c. will provide a seal which is as strong as, or stronger than, the plastic resin sheets which the seal adheres together;

d. will be adapted for automatic high speed production;

e. will not char, or otherwise degrade, the plastic resin film sheets;

f. will be relatively inexpensive in initial cost and relatively low in power consumption.

It is a feature of the present invention to provide a machine for sealing together and severing two or more plastic resin films. The machine comprises a base plate upon which the films are positioned, a platen movable relative to the base plate and movable toward and away from the films on the base plate, and compression means to press the platen toward the films at selected times.

A sealing die is mounted on the platen and comprises a heat resistant and electrically insulative rigid substrate, a heat sealing element of a metal foil bonded to the substrate, the width of said heat sealing element being many times its thickness, and a non-stick layer covering the heater element and being sufficiently wide and at least one-sixteenth inch in width to form a liquid leakproof seal of the films. Second control means connect the heater element to a source of voltage for selected short times of less than 5 seconds for impulse resistance heating of the heater element. An electrical resistance knife is mounted on the platen close to the heater element to sever the films by melting. Second control means connect the knife to a source of voltage to heat the knife and thereby melt and sever the film.

BRIEF DESCRIPTION OF THE DRAWINGS

Other objectives and features of the present invention will be apparent from the following detailed description of the invention which is the best mode contemplated by the inventor for carrying out his invention. That description should be taken in conjunction with the accompanying drawings.

In the drawings.

DETAILED DESCRIPTION OF THE INVENTION

Figure 1:
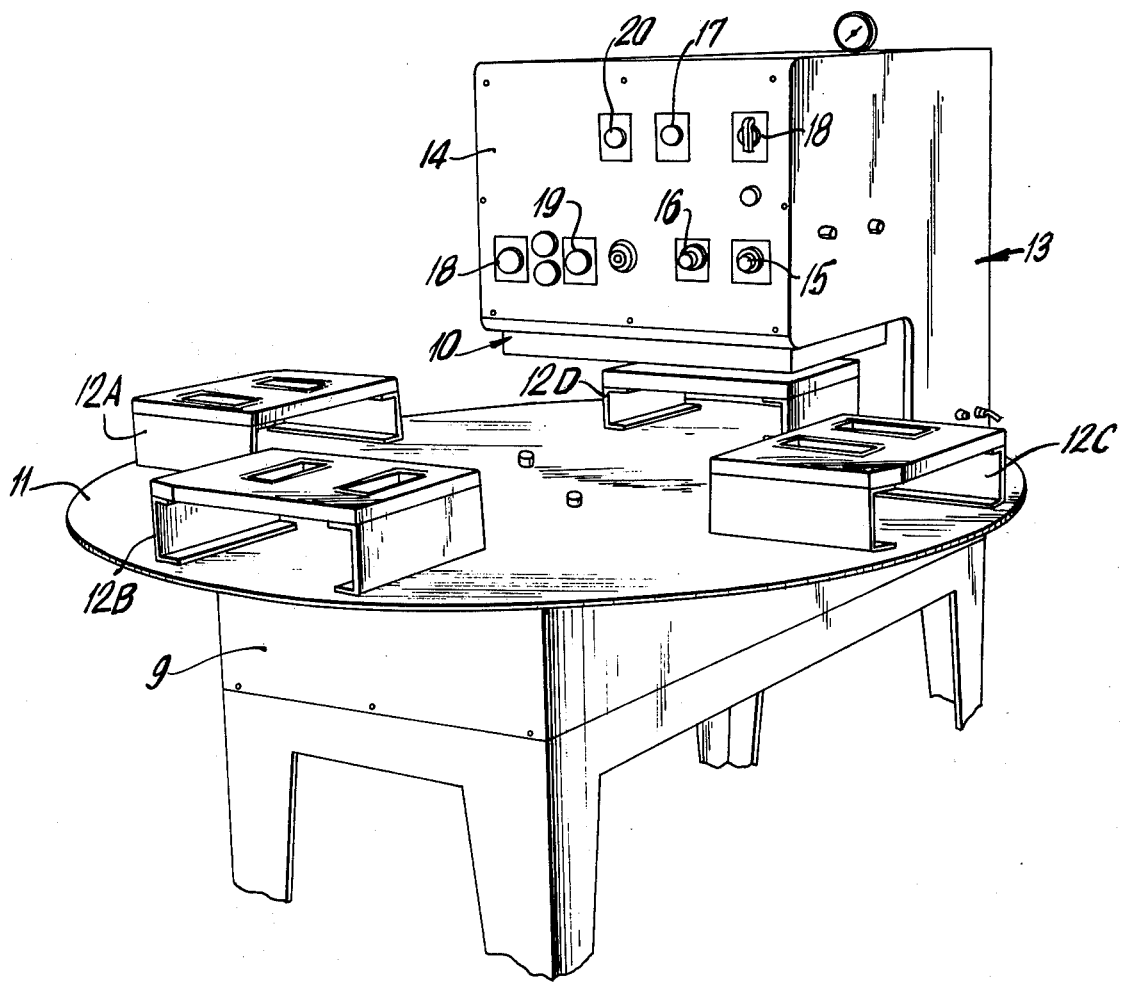
FIG. 1 is a perspective view illustrating the present invention utilized in a rotary index table.

As shown in FIG. 1, the embodiment of the present invention which is the sealing and severing machine includes a base 9. The base has a cover which encloses an index system including an electric motor (not shown), a gear transmission system (not shown), and a control system (not shown). The index system rotates the index table 11, which is rotatably mounted on the base 9, in one direction in timed and equal steps. Index tables suitable for use in the present invention, which are rotatable to a preselected position and have a preselected dwell time (stopping time) at a work station, are commercially available and well-known in the art.

The index table shown in FIG. 1 utilizes a four-step index system in which each stepped rotation of the index table will be 90°. The dwell time is sufficient so that the sealing and severing of the film may be accomplished at the work station. Preferably the dwell time will be for 2 to 6 seconds. The index table 11 carries four base plates 12A, 12B, 12C, 12D which are equally spaced about the top surface of the index table near its outer circumference. Each base plate 12A - 12D has a positioning means to retain two pre-cut sheets of plastic resin film, with one sheet lying on top of the other sheet.

In the embodiment shown in FIG. 1, the positioning means are spring-loaded pins which are pushed into holes in the base plates under pressure and will, because of their spring-loading, automatically resume their protruding position upon the release of such pressure. Alternatively, other film positioning means may be used, such as a series of holes through each plate connecting the top of the plate to a timed source of vacuum.

A fixed work station 13 is located at one end of the base 9. In the index table position illustrated in FIG. 1, an operator may load the film sheets onto the plate 12B and the plate 12B will then be indexed to the position of the plate 12C, at which no operation will be performed. The base plate 12B will then be indexed to the position shown for plate 12D in FIG. 1, at which the sealing and severing operation will be performed. The base plate 12B will finally be indexed to the position shown for base plate 12A in FIG. 1, at which location the finished sealed and severed film is removed and the outer edge of the film, which has been severed from the finished piece, is also removed.

The work station 13 includes a cabinet 14 having a series of operator settable dials. These dials include a dial 15 to set the desired impulse voltage of the heater element, for example, 40 volts, to obtain a heat of 400° F at the heater element; a dial 16 to set the desired timing of the heater element, that is, for how many seconds or fractions of a second the voltage will be applied to the heater element; a dial 17 to set the descent and ascent timing of the heater knife; a dial 18 to set the knife impulse timing, i.e., the time the voltage is connected to the heater knife; a dial 19 to set the impulse voltage of the heater knife; and a dial 20 to set the timing of the air compression mechanism which compresses the platen assembly 10. The platen assembly 10 and its air compression piston (not shown) is within the cabinet 14. That piston is connected to a source of air pressure.

In U.S. Pat. No. 3,617,696 to John E. Reenstra, whose disclosure is incorporated by reference herein, there is described, in connection with its FIGS. 5 and 6, a laminated heat sealing tray in which the heater element is formed by etching a metal foil bonded to a high-temperature composition insulating substrate. The foil is then covered with a non-sticking layer, which is a coating or sheet which will not stick to the plastic film when the film is heated. Electronic power circuits are therein described, one circuit including silicon controlled rectifiers to provide the predetermined required power for each heater element.

The method of manufacture and suitable materials for the heater assembly is described in Reenstra U.S. Pat. No. 3,617,696 mentioned above. It is a laminate in which the heater elements are the metal portions of a metal foil which remain after an etching process.

The substrate 120 of the laminate is a rigid insulating material which is capable of withstanding repeated cycles of high temperatures of over 400° F. without degradation. A suitable substrate is an epoxy impregnated fiberglass woven material; and other suitable substrate materials are asbestos-filled phenolic resin, silicon rubber, and glass-filled melamine resin.

A thin metal foil is adhered to the substrate by a suitable heat resistant adhesive, for example, a silicon-base bonding cement. The metal foil may be copper, nickel, chromium, stainless steel, nichrome, nickel-silver, copper-nickel, Invar, Imonel, carbon-steel, Kovar or other suitable metal having a thickness in the range of 0.004 inch to 0.010 inch.

The shape and width of the heater elements are laid out and masking tape, wax or other suitable protective coverings are applied to the areas of foil which are to constitute the spacing between the heater elements. An etch-resistant material is then applied and coats the areas of metal foil between the masking tape. The etch-resistant material is allowed to dry and the masking tape is removed, exposing the foil areas under the tape. Those exposed areas are then ready to be etched away.

The substrate and its bonded foil is then immersed in an acid etching bath, such as Hunt Chemical Corp. RCE solution, and the unprotected areas of foil are etched away by the bath. The foil under the etch-resistant coating will be exposed and will constitute the heater elements. The substrate and its bonded and etched foil is removed from the etching bath and washed, and the protective etch-resistant coating removed, exposing the metal heater elements.

After washing, the laminate is baked for 2 hours at a low temperature, 150° F., to dry the laminate. The width of the heater elements is usually one-sixteenth to one-eighth of an inch and they determine the width of the leakproof seal. The substrate and etched foil is then cooled and a non-stick layer is applied over the heater elements and fixed relative to the substrate. Preferably the non-stick layer is a flexible sheet of Teflon (TM of DuPont) for polytetrafluoroethylene) which is impregnated into or coated upon woven fiberglass. For example, a suitable non-stick layer is a Teflon coated woven fiberglass sheet which may be attached to the laminate by using a double-sided adhesive sheet which adheres to the Teflon sheet and to the laminate. The adhesive is not a permanent laminate type bond but may easily be peeled off. Alternatively, the non-stick layer may be a sprayed-on coating of Teflon or silicon base material, for example, of 0.001 inch thickness. Alternatively to etching, the heater elements (the flat electrodes) may be formed by stamping or machining from a suitable sheet metal and then adhered to the insulative substrate.

Figure 2:
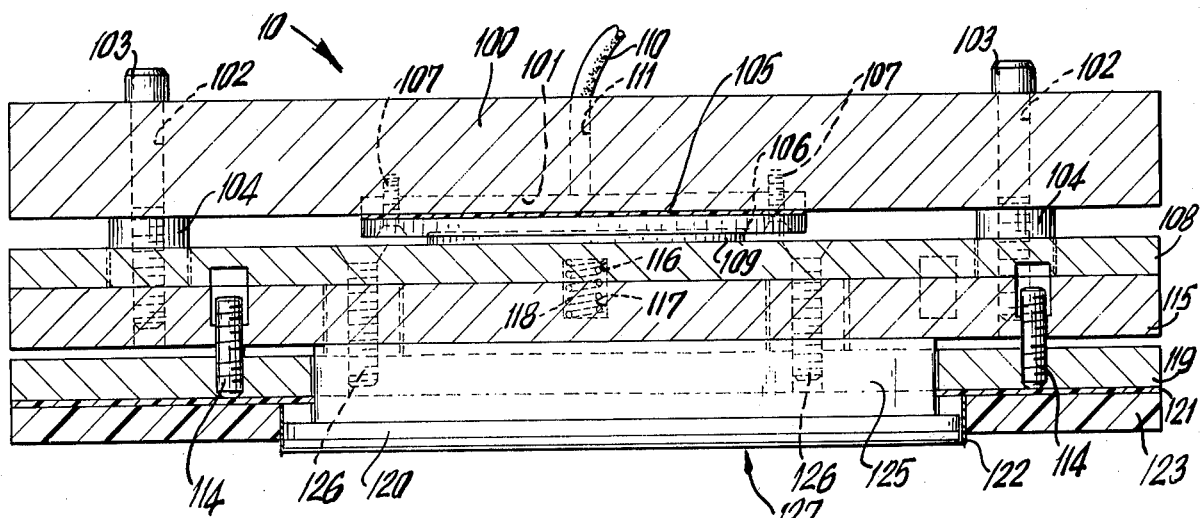
FIG. 2 is a cross-sectional view of the platen assembly taken along line A—A of FIG. 3.

As shown in FIG. 2, the top platen assembly 10 is a vertically movable compression member. The top platen assembly 10 includes top platen 100, a steel plate, which is the mounting plate for the other members of the platen assembly 10. The top platen 100, at its bottom center portion, has a cavity 101 forming an air plenum (air chamber). The top platen 100 has a number of holes 102 through which bolts 103 are secured.

Figure 3:
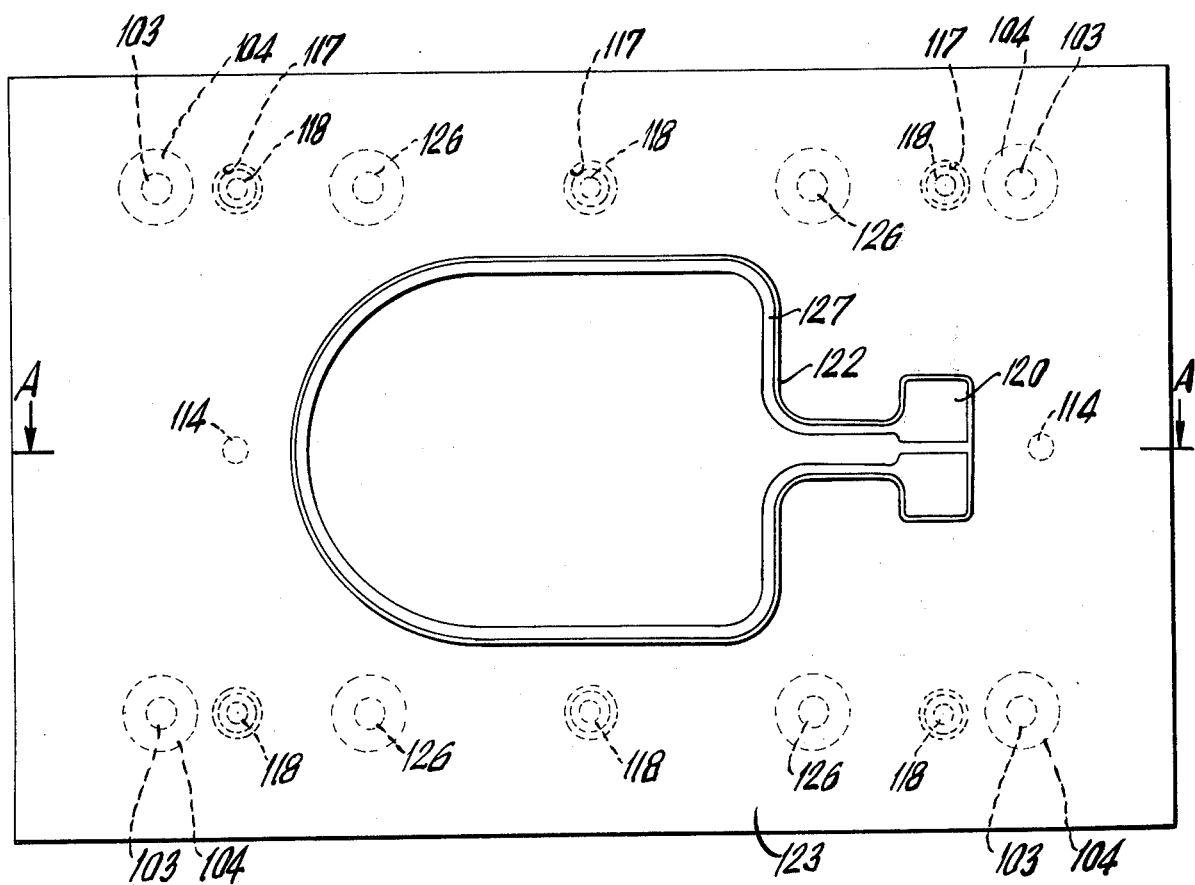
FIG. 3 is a bottom view of the platen assembly.

Each of the bolts 103 carries a spacer block 104 in the shape of a thick washer. The hole in each spacer block 104 surrounds the shaft of the bolt 103 and the bottom of each spacer block 104 rests on the top platen 100. The number of bolts and associated spacer blocks will depend upon the size and shape of the platen. The particular embodiment illustrated in FIG. 3 utilizes four bolts 103 and consequently four spacer blocks 104.

A flexible sheet 105 is fastened over the cavity 101. The flexible sheet 105, upon an injection of air pressure into cavity 101, inflates and attains a dome-like shape. Preferably the inflatable flexible sheet 105 is a sheet of heat-resistant flexible silicon rubber. The flexible sheet 105 is fastened and air-sealed to the top platen 100 by means of an annular clamp ring 106. The annular clamp ring is positioned on the top outer circumference of the flexible sheet 105 and is held tightly to the top platen 100 by means of screws 107. Although two screws are shown in the side view of FIG. 2, it will be understood that there are a larger number so as to securely position the clamp to the top platen. For example, 6 or 8 evenly spaced screws are preferably used.

The spacer blocks 104 are of uniform thickness and are sufficiently thick so that they form a gap between the top platen 100 and the movable plate 108. There is also a gap between the bottom of the clamp ring (the end of the clamp ring which is not clamped down) and the movable plate 108. The movable plate, on its top side, carries a pusher plate 109 which is circular and whose diameter is smaller than the internal diameter of the clamp ring 106. The flexible sheet 105, upon its expansion, will strike against the free end of the pusher plate 109. Compressed air is injected into the cavity 101 through the flexible air line 110, which is fastened to the internal bore 111 through the top platen 100, the bore 111 leading to the plenum chamber 101.

A fixed plate 115 is mounted beneath the plate 108. Each of the plates 115 and 108 has facing cavities, respectively 116 and 117, two such cavities 116 and 117 being shown in FIG. 2 and there being six such cavities in the device. Compression springs 118 are mounted in each of the cavities, such as within cavities 116 and 117, and those springs tend to separate the two plates 108 and 115.

The fixed plate 115 is fixed to the top platen 100 by the bolts 103. A rim plate 119 moves relative to the fixed plate 115 and is fixed relative to the movable plate 108 by the bolts 114 which connect together the plates 119 and 108. The bolts 114 are connected through holes in the fixed plate 115 so that the bolts 114 move freely within those holes. The plate 119 is of steel and is covered by a narrow plate 121, for example, of insulative epoxy material. A knife blade 122, which is a thin, sharp, electrically conductive metal member, is secured in a groove within the insulative Bakelite (T.M. of Union Carbide) knife plate 123 and protrudes from its groove. The insulative knife plate 123 is attached to the insulative plate 121 which in turn is attached to the metal rim plate 119. Consequently, the movement of the metal rim plate 119 will move the knife blade 122.

The knife blade 122 is moved downwardly (to sever the plastic film) by means of injection of air pressure to the air cavity 101. Upon release of the air pressure, the knife blade 122 is moved upwardly by means of the six springs 118. The fixed plate 115 is fastened to the fixed plate 125 by means of bolts 126. The fixed plate 125, in turn, is fixedly connected to the substrate 120, which is the rigid backing member of the heater element 127. The heater element 127 is at least one-sixteenth inch in width and the knife blade 122 lies close to the outer end of the heater element 127, for example, within one-sixteenth inch. The knife blade follows the contour of the outer heater element.

The electric control circuit to supply voltage to the heater element is preferably one which permits both the timing and the heat to be set. A suitable circuit is described in FIGS. 1 and 2, and the accompanying text, of U.S. Pat. No. 3,617,696, mentioned and incorporated by reference above. In that circuit a thermistor, which is a temperature responsive element, senses the temperature of the heater element and is connected through a control set resistor to a control circuit. The control circuit provides a control signal to a silicon controlled rectifier circuit which supplies voltage to the heater element.

In operation, the following steps are performed in sequence:

1. The two thermoplastic films are brought beneath the platen with the sheets touching the one sheet lying flat on the other.

2. The platen is moved vertically downward and compressive pressure is brought against the film layers which are positioned between the platen and the base plate. The pressure is at least 1 ton, which may be obtained using a conventional air cylinder.

3. The impulse voltage is connected to the sealing die. That voltage is connected by means of the impulse sealing timer so that the resistance heater elements become heated. The duration and voltage of the impulse voltage is dependent upon the length and width of the heater elements, as well as the type of thermoplastic material which is to be sealed. For example, if the thermoplastic films are both polyethylene films and the length of the seal is about 12 inches and the width of the seal is about one-eighth of an inch, then a suitable voltage would be 40 volts and a suitable timing would be 1½ seconds. The actual temperature of the heating elements (of the metal foil) during the impulse heating will be about 400° F.

4. In the fourth step the voltage to the heater elements is shut off and a timer introduces air pressure into the air cavity plenum 101. This causes the flexible sheet 105 to expand, moving the series of connected plates downwardly and bringing the hot knife vertically downwardly against the film layers. The heated knife will melt, i.e., "tear seal," the then-joined films outside but close to the seal. For example, there may be a space of as little as 10 mils between the outer edge of the seal and the melt line, which is the "tear seal." The tear seal is the melted edge of the plastic which is melted by the heated knife edge. During the severing of the film by means of the heated knife the compression pressure is being maintained and the seal is cooled under that compression pressure. The action of the tear-sealing (melting) of the films is relatively rapid and may take from ½ to 1 second. At the end of that time period of ½ to 1 second, the air pressure is released and the knife edge moves back in a vertically upward direction.

5. The compression pressure on the platen is then released and the platen is lifted vertically upward.

6. The finished article, which is the sealed and severed film which has been joined, is removed from between the platen and the base plate. Such removal may be accomplished, for example, by an operator or by a timed air jet or by movement of a timed arm sweeping across the base plate. At the same time, the connected outside and unused portions of the plastic film are removed from between the platen and the base plate. Such removal may be accomplished by an operator or by rolling the unused plastic film (the outer edges of the plastic film) upon on a motor driven and timed roller.

Although the present description has described the sealing operation in connection with the sealing of two plastic films one to another, it will be understood that more than two films may by used. For example, the apparatus and method of the present invention may be used to join and seal three films or even four films, provided the films are sufficiently thin. The thermoplastic films which may be used in connection with the present invention are those which are conventionally used with tear-sealing machines and include thermoplastic coated thermoset films. Examples of such films are polyethylene, Saran (TM of Dow Chemical Co. for polyvinylidene chloride), Suprathen (TM of Hoechst for high pressure polyethylene), Hostaphan (TM of Hoechst for polyterephthalic ester), polypropylene, lacquer coated cellophane, polyvinylchloride, and Seranac (TM of Dow for polyethylene coated with Seran).

The description given above is of a heated knife edge which is constantly electrically heated so that it is at one constant temperature and which, at timed intervals by means of timed injections of air pressure, is compressed against the plastic films to sever the films. Alternative to the air pressure mechanism, other mechanisms, such as a solenoid or a mechanical cam, may be utilized to press the heated knife against the plastic films in timed relationship to the sealing operation.

As another alternative, the heated knife may be fixed relative to the sealing heater elements, for example, by being attached to the substrate, and the heated knife may protrude with a height differential, from the substrate, above the non-stick layer. In that mechanism the compression stroke of the platen would, at the same time, both seal the film (using the impulse heater element) and sever the film by melting (using the protruding heated knife edge).

Alternatively, using the same construction of a protruding knife edge which compresses the film into a resilient material, the knife edge and heater elements may both be impulse heated. In that mechanism, in predetermined timed sequence, first the platen presses upon the film layers; secondly the leakproof seal is formed by the heater elements; thirdly the knife edge is heated and melts through and severs the film outside of the seal area and simultaneously the seal is cooled; fourthly the platen pressure is released and the sealed and severed film is removed.

Also alternatively, instead of a constant heating, the knife may be heated by impulse heating (timed electrical connection). In either case the knife must be sufficiently heated at the moment it touches the film to melt through the film.

Although the present invention has been described in connection with a rotary feeding machine, other types of film feeding devices may be utilized. For example, the feeding of the film may be "in line" with each film being unrolled from rolls and with the rolls having their axis in parallel to each other.

The platen in the above-described embodiment is moved vertically by air pressure and is above a fixed base. Alternatively, the platen may move vertically from below and move against a fixed upper member. Or, as another alternative, the laminated heater structure may be fixed and a pressure platen may be moved against it with the two film layers therebetween.

I claim:

1. A machine for sealing together and severing two or more plastic resin films, comprising:
   a base plate upon which the films are positioned;
   a platen movable relative to the base plate and movable toward and away from the films on the base plate;
   compression means to press said platen toward said films at selected times;
   a sealing die mounted on said platen and comprising a heat resistant and electrically insulative rigid substrate, a heat sealing element of etched metal foil having a uniform thickness bonded to said substrate, the width of said heat sealing element being many times its thickness and being sufficiently wide and at least one-sixteenth inch in width to form a liquid leakproof seal of said films, said heat sealing element having a curved portion to form a curved seal, a non-stick layer covering said heat sealing element;
   control means connecting said heater element to a source of voltage for selected short times of less than 5 seconds for impulse resistance heating of said sealing element;
   an electrical resistance knife mounted on said platen and close to said heat sealing element to sever the films by melting, said knife having a curved edge parallel to the curve of said heat sealing element to sever said films along a curved line;
   means connecting said knife to a source of voltage to heat said knife and thereby melt and sever said film.

2. A machine as in claim 1 and further including a rotary motor driven index turntable having an index table and a plurality of base plates mounted on said index table, and film holding means on each base plate to secure the layers of film on the plate, and control means to index said table so that each plate in turn is indexed in proximity to said platen, the index table is paused in rotation during the sealing and severing operation, and then the index table is again rotated.

3. A machine as in claim 1 wherein said compression means includes a source of air pressure, an air pressure control valve, and an air cylinder.

4. A machine as in claim 1 wherein said non-stick layer is a woven fiberglass sheet impregnated with a fluorohydrocarbon plastic resin.

5. A machine as in claim 1 wherein said knife is about the same length and about the same contour as the heat sealing element and within one-sixteenth of an inch of said heat sealing element.

6. A machine as in claim 1 wherein said control means includes a circuit having a temperature sensitive means and a partial cycle conduction control circuit responsive to said temperature sensitive means.

7. A machine as in claim 1 wherein said base plate includes a heat resistant flexible inlay arranged opposite said knife so that the film is melted between said knife and said inlay.

8. A machine as in claim 1 wherein said knife is mounted on a knife plate and said knife plate is movably mounted on said platen.

* * * * *